(12) United States Patent
Zeleny et al.

(10) Patent No.: US 6,910,719 B1
(45) Date of Patent: Jun. 28, 2005

(54) CONNECTING DEVICE

(75) Inventors: Franco Zeleny, Besigheim (DE); Thomas Raff, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 09/958,127

(22) PCT Filed: Feb. 2, 2001

(86) PCT No.: PCT/DE01/00432

§ 371 (c)(1),
(2), (4) Date: Aug. 1, 2003

(87) PCT Pub. No.: WO01/57427

PCT Pub. Date: Aug. 9, 2001

(30) Foreign Application Priority Data

Feb. 4, 2000 (DE) .............................. 100 04 970

(51) Int. Cl.[7] .............................................. F16L 37/00
(52) U.S. Cl. ..................... 285/308; 285/86; 285/315; 285/316; 285/84; 285/85
(58) Field of Search ............................ 285/84, 85, 86, 285/308, 315, 316, 317

(56) References Cited

U.S. PATENT DOCUMENTS

| | | | | |
|---|---|---|---|---|
| 1,871,370 A | * | 8/1932 | Jacques | 285/85 |
| 3,435,848 A | * | 4/1969 | Johnston | 137/614.04 |
| 3,507,523 A | * | 4/1970 | Cadley | 285/307 |
| 4,436,125 A | * | 3/1984 | Blenkush | 141/330 |
| 4,540,201 A | * | 9/1985 | Richardson | 285/101 |
| 5,255,714 A | * | 10/1993 | Mullins | 137/614.04 |
| 5,489,125 A | * | 2/1996 | Hohmann | 285/81 |
| 6,412,828 B1 | * | 7/2002 | Lacroix et al. | 285/316 |
| 2003/0025326 A1 | * | 2/2003 | Schulte | 285/316 |

FOREIGN PATENT DOCUMENTS

| | | |
|---|---|---|
| DE | 25 02 830 A | 7/1976 |
| DE | 25 57 674 A | 7/1976 |
| EP | 0 756 125 A | 1/1997 |
| FR | 2 678 349 A | 12/1992 |

* cited by examiner

Primary Examiner—James M. Hewitt
(74) Attorney, Agent, or Firm—Michael J. Striker

(57) ABSTRACT

A connecting device (20) for connecting a connection hose or connection tube to a receiving device includes a tubular connection neck (2), an actuating sleeve (28), and a support sleeve (38). The receiving device, to which the connecting device (20) can be connected, includes at least one detent element, which is actuatable by means of at least one actuating element mounted on the receiving device. The connection neck (2) is connectable to the connection hose or connection tube and has a detent lug (20) or detent groove, which can be brought into engagement with the detent element of the receiving device. The actuating sleeve (28) serves to actuate the actuating element of the receiving device. The support sleeve (38) is braced on the receiving device and is axially displaceable relative to the actuating sleeve (28), prestressing a first spring (44).

12 Claims, 3 Drawing Sheets

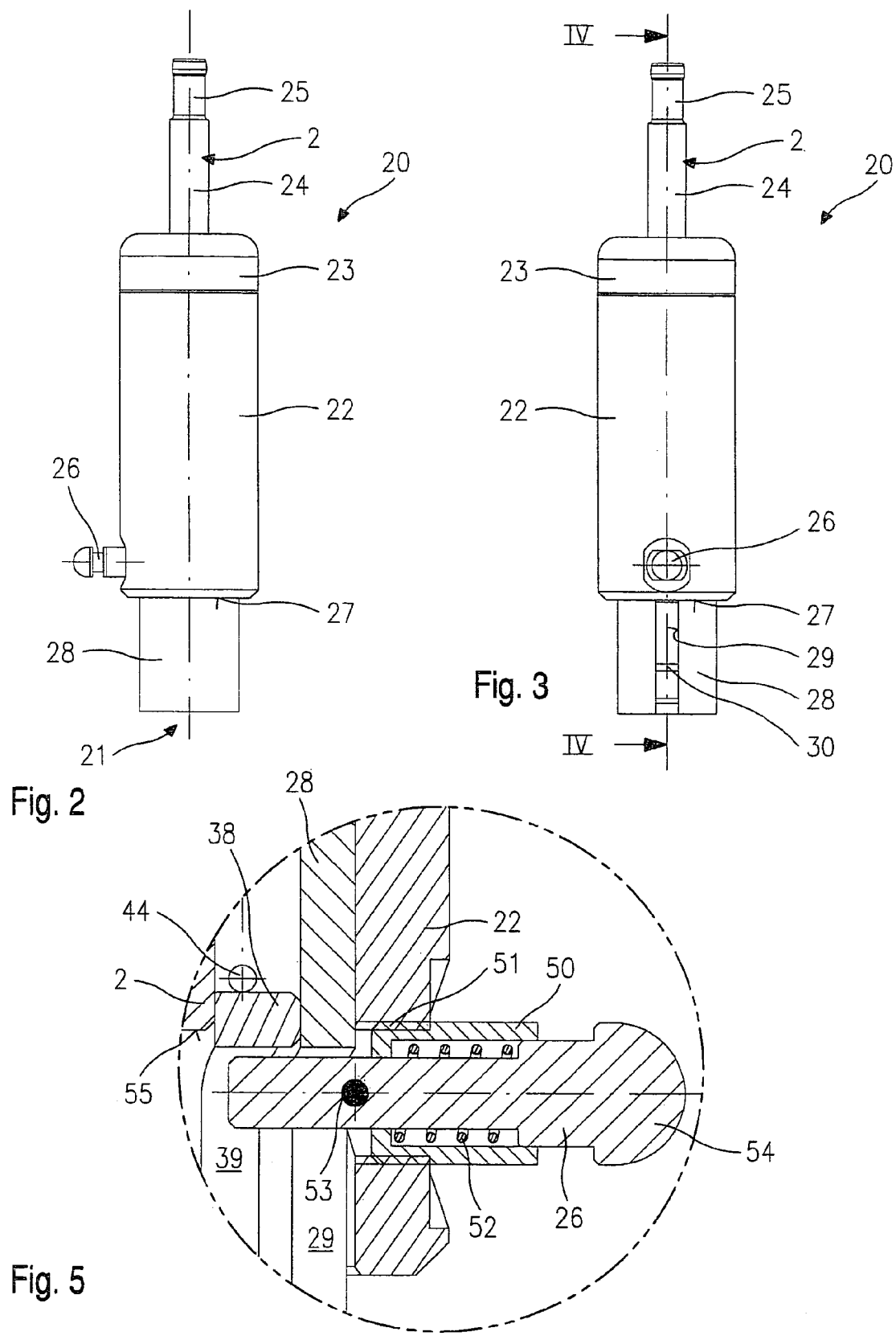

CONNECTING DEVICE

PRIOR ART

Figure 1:
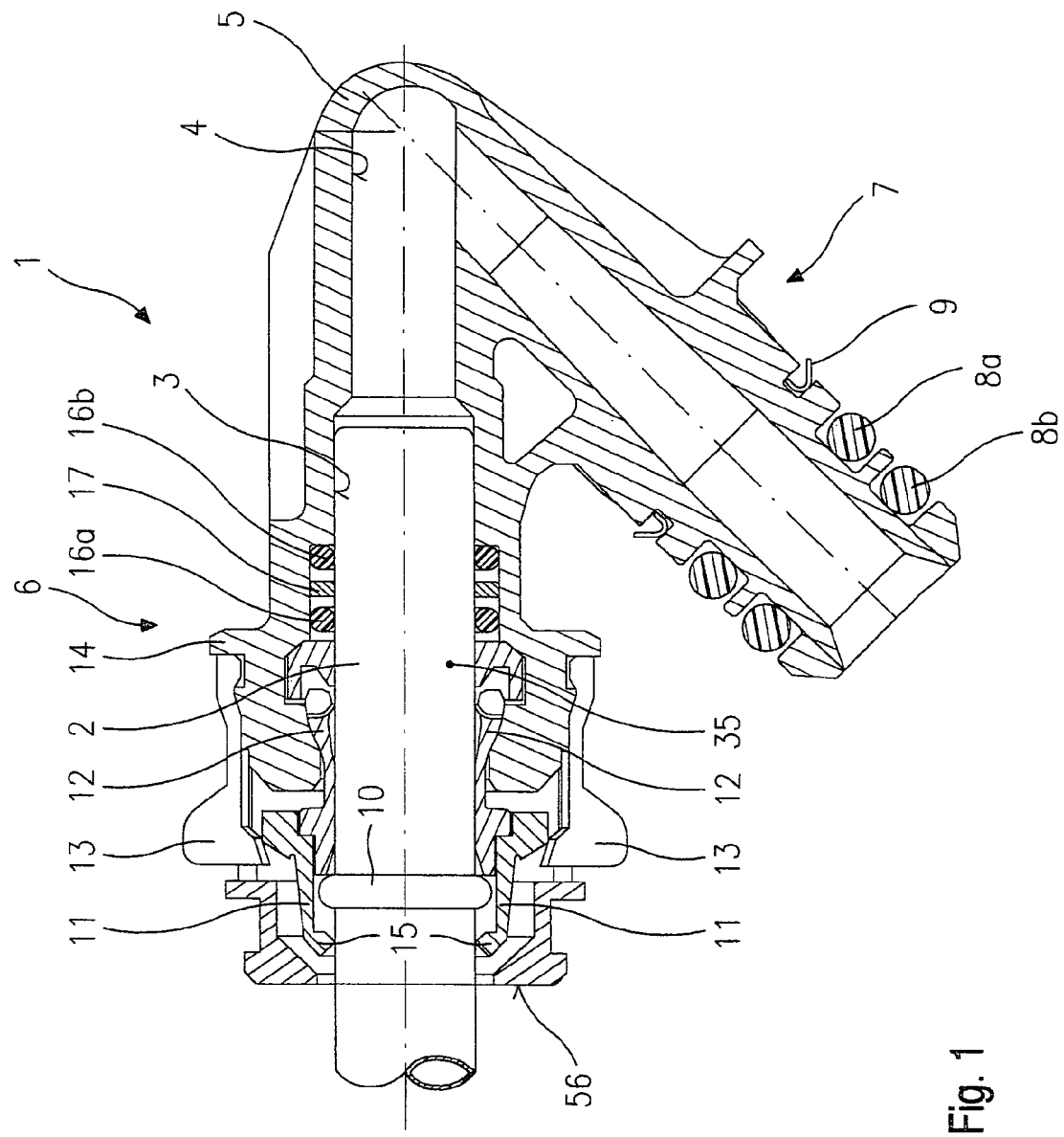

The invention relates to a connecting device for connecting a connection hose or connection tube to a suitable receiving device that receives the connecting device. This receiving device has at least one detent element, which is actuatable by means of at least one actuating element, mounted on the receiving device.

One such receiving device is known from European Patent Disclosure EP 0 756 125 A1. The pipe connection disclosed in this reference includes a receiving device into which a connection neck can be introduced. The connection neck has a detent lug, which is engaged from behind by a plurality of detent elements of the receiving device. In one exemplary embodiment, shown in FIG. 10 of this reference, the detent elements are embodied in the form of levers and can be actuated, by means of actuating elements provided on the outside of the receiving device, in such a way that they release the detent lug of the connection neck, introduced into the receiving device, again as needed.

Of the connecting device cooperating with the receiving device, EP 0 756 125 A1 shows only the connection neck, which can be connected to a connection hose or connection tube. Provisions for an automatic actuation of the actuating elements of the receiving device are not contemplated in the connecting device, which comprises only the connection neck.

It is true that the connection neck can be introduced in a simple way into the receiving device and is sealed off, in the introduced position, by two sealing rings. In addition, the detent locking of the detent element of the receiving device to the detent lug of the connection neck is assured, and so the connection neck cannot be pulled out of the receiving device unintentionally. In practice, however, the need exists to connect the connection neck of the connecting device quickly and securely to the receiving device and to detach it again from it with a simple manipulation. Especially if the receiving device known from EP 0 756 125 A1 is used in a fuel distributor line of an internal combustion engine, the need exists of connecting a fuel hose to the receiving device, which is a fill neck of the fuel distributor line, for a test run of the engine, simply and quickly in terms of manipulation, and to remove it again therefrom without manipulation problems.

If the connecting device cooperating with the receiving device comprises only a single, tubular connection neck, then it is already difficult to exert the required axial force to introduce the connection neck into the receiving device. Removing the connection neck from the receiving device proves to be complicated, since the connection neck has to be pulled out of the receiving device, and at the same time the actuating elements, disposed radially on the outside of the receiving device, must be actuated in order to disengage the detent connection.

ADVANTAGES OF THE INVENTION

The connecting device of the invention having the characteristics of the body of the main claim has the advantage over the prior art that the detent element of the receiving device, engaging the detent lug of the connection neck from behind, is actuated automatically by the actuating sleeve when the connecting device of the invention is coupled to the receiving device. This actuation process is reinforced by the support sleeve, which is braced on the receiving device. Because of the automatic actuation of the detent element of the receiving device, manipulability is improved considerably, since the user merely has to introduce the connection neck into the opening of the receiving device and then slide the entire connecting device in the direction of the receiving device; the actuation of the detent element of the receiving device and thus the detent locking of the connection neck in the receiving device are automatically tripped thereby. The mounting of the connecting device on the receiving device can therefore be done with a single gesture. The support sleeve in combination with the first spring assures that after the detent locking of the connection neck in the receiving device, the actuating sleeve is removed from the actuating element of the receiving device by axial displacement of the actuating sleeve, and the detent element of the receiving device therefore remains locked.

By the provisions recited in the dependent claims, advantageous refinements of and improvements to the connecting device defined by the main claim are possible.

A slide sleeve that can be grasped from outside by the user is advantageous; preferably via a cover element secured to the slide sleeve, it engages a shoulder of the connection neck and allows an axial displacement of the connection neck in the direction of the receiving device. The connection neck, support sleeve, actuating sleeve and slide sleeve are preferably disposed coaxially to one another, and the slide sleeve surrounds the actuating sleeve; the actuating sleeve surrounds the support sleeve; and the support sleeve surrounds the connection neck.

The actuating sleeve is preferably axially displaceable relative to the slide sleeve, prestressing a second spring. Via this second spring, the actuating sleeve, upon introduction of the connection neck into the receiving device, is pressed in the direction of the receiving device, so that the actuating sleeve actuates the actuating elements and thus the detent elements of the receiving device. If the user lets go of the slide sleeve after that, then the second spring relaxes and no longer exerts any force on the actuating sleeve. The first spring, fastened between the support sleeve and the actuating sleeve, conversely presses the actuating sleeve away from the receiving device, so that the actuating sleeve releases the actuating element of the receiving device, and the detent element of the receiving device thus remains locked until such time as the user, to disengage the connecting device from the receiving device, again displaces the slide sleeve in the direction of the receiving device. The second spring can be disposed between the cover element and one end face of the actuating sleeve.

In an especially preferred embodiment, a detent bolt is provided on the slide sleeve, the detent bolt being radially displaceable such that it can be brought into engagement with a shoulder provided on the connection neck. The detent bolt is preferably displaceable counter to a third spring, and in an unpressed basic position, the detent bolt enables the axial motion between the connection neck and the slide sleeve, and in a pressed actuation position, it carries the connection neck with it upon a motion of the slide sleeve leading away from the receiving device.

DRAWING

Figure 4:
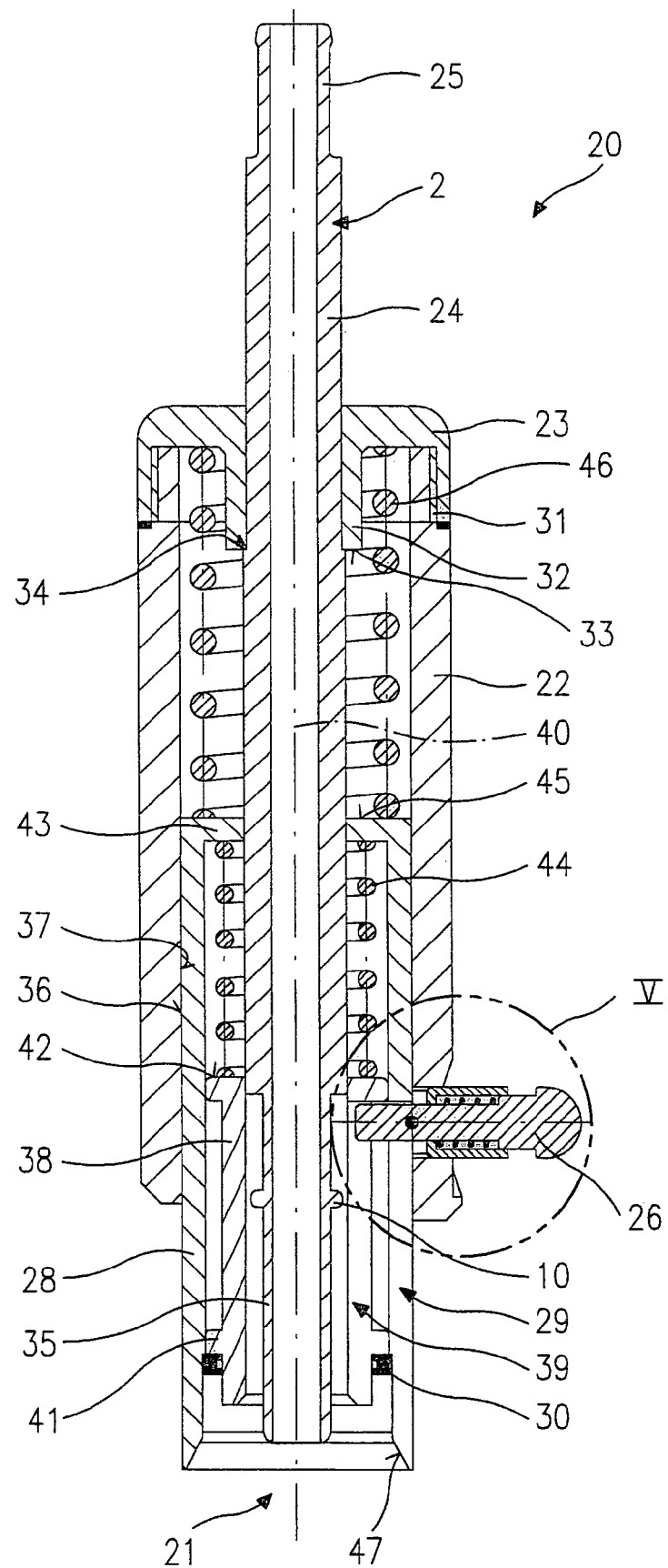

One exemplary embodiment of the invention is shown in simplified form in the drawing and described in further detail in the ensuing description. Shown are:

FIG. 1, the connection neck of the connecting device of the invention, introduced into a suitable receiving device, shown in section;

FIG. 2, a side view of an exemplary embodiment of the connecting device of the invention;

FIG. 3, the front view of the exemplary embodiment, shown in FIG. 2, of the connecting device of the invention;

FIG. 4, a section taken along the line IV—IV in FIG. 3; and

FIG. 5, the detail V in FIG. 4.

DESCRIPTION OF THE EXEMPLARY EMBODIMENT

Before an exemplary embodiment of the connecting device of the invention is described in detail in conjunction with FIGS. 2–5, first a receiving device 1 which cooperates with the connecting device of the invention will be described below, in conjunction with FIG. 1, for the sake of better comprehension of the invention.

FIG. 1 shows an exemplary embodiment of a receiving device 1 suitable for cooperating with the connecting device of the invention; a connection neck 2 of the connecting device of the invention has been introduced into the receiving device 1. The connection neck 2 is embodied in tubular form; FIG. 1 shows only the end of the connection neck 2 that can be introduced into the receiving device 1. The receiving device 1 has a stepped receiving recess 3, which merges with a flow conduit 4 of an angled portion 5. While the connecting device 1 of the invention is connected to a first leg 6 of the receiving device 1, the receiving device 1 in turn can be connected at a second leg 7 to a fuel distributor line, for instance, that serves to supply fuel injection valves with fuel. For sealing off from the fuel distributor line, two sealing elements 8a and 8b, embodied for instance as O-rings, are provided on the leg 7. The locking at the fuel distributor line is done by means of a detent spring 9.

The connecting device of the invention serves in particular, in a test run of the internal combustion engine, for instance immediately after production of the engine has been completed, to enable an easily manipulated connection of a connection hose, which can be connected to the connection neck 2 and serves to deliver fuel, to the receiving device 1. The mounting and unmounting of the connecting device onto and off from the receiving device 1 are intended to be doable with a single gesture.

The connection neck 2 has a detent lug 10, in the form of a beadlike portion of expanded diameter. In the inserted state shown in FIG. 1, the detent lug 10 is engaged from behind by a plurality of circumferentially distributed detent elements 11 of the receiving device 1. The detent elements 11 are embodied in the form of levers and are supported on associated bearing elements 12. Likewise circumferentially distributed actuating elements 13 protrude radially out of the housing 14 of the receiving device 1. If a radially inward-oriented actuating force is exerted on the actuating elements 13, then the detent elements 11 are tilted in such a way that their end portions 15 lift away from the connection neck 2, so that the detent lug 10 can be moved past the detent elements 11, either for introducing the connection neck 2 or for pulling the connection neck 2 back out again.

For sealing off the connection neck 2 from the housing 14 of the receiving device 1, two sealing elements 16a and 16b, embodied for instance as O-rings, are provided, which are separated from one another by a spacer ring 17.

FIG. 2 shows a side view of an exemplary embodiment of the connecting device 20 of the invention. The lower end 21, in terms of FIG. 2, of the connecting device 20 serves to connect it to the receiving device 1, not shown in FIG. 2. A slide sleeve 22 can be seen, which is connected to a cover element 23, for instance by a screw connection. The cover element 23 has a recess, from which a portion 24 of the connection neck 2, remote from the receiving device 1, protrudes. At a connecting portion 25, the connection neck 2 can be connected to a connection hose, which serves in particular to deliver fuel. The slide sleeve 22 can have a knurled or otherwise roughened surface, so that the surface of the slide sleeve 22 can be conveniently grasped by the user. A detent bolt 26, whose function will be described in further detail below, protrudes out of the slide sleeve 22. An actuating sleeve 28 protrudes from the end 27 of the slide sleeve 22 oriented toward the receiving device 1.

FIG. 3 shows the exemplary embodiment shown in FIG. 2 in a front view. In all the drawing figures, the same reference numerals are used for the same elements, for the sake of greater clarity. No attempt will be made to repeat their description.

As can be seen from FIG. 3, the actuating sleeve 28 has a slot 29, through which the bolt 26 protrudes. A ring 30, whose function will be described hereinafter, can also be seen, inserted into the actuating sleeve 28.

FIG. 4 shows a section taken along the line IV—IV in FIG. 3. As can be seen from FIG. 4, the cover element 23 is embodied as cup-shaped, and in the exemplary embodiment it is screwed to the slide sleeve 22 at a thread 31. In principle, the slide sleeve 22 and the cover element 23 can also be embodied integrally or for instance can be welded together. On an inner, mandrel-like extension 32, the cover element 23 has an end face 33, which engages a shoulder 34 of the connection neck 2, so that the axial free mobility of the connection neck 2 relative to the slide sleeve 22 is limited on one side, in a direction leading away from the receiving device 1.

On a portion 35 that can be introduced into the receiving device 1, the connection neck 2 has the detent lug 10 already described above. The slide sleeve 22 at least partly surrounds the actuating sleeve 28, whose outer face 36 is guided along the inner face 37 of the slide sleeve 22. The actuating sleeve 28 in turn surrounds a support sleeve 38, which likewise has a slot 39 in the region of the slot 29 of the actuating sleeve 28. The support sleeve 38 partly surrounds the connection neck 2. The tubularly embodied connection neck 2, the support sleeve 38, the actuating sleeve 28, and the slide sleeve 22 are disposed coaxially to one another with respect to a center axis 40.

The axial mobility of the support sleeve 38 in the direction of the end 21 toward the receiving device 1 is limited by the ring 30, inserted into the actuating sleeve 28, against which ring a radial widening 41 of the support sleeve 28 strikes. A first spring 44 is fastened between an end face 42 of the support sleeve 28 remote from the receiving device 1 and an end of the actuating sleeve 28, remote from the receiving device 1; upon an axial displacement of the support sleeve 38, this first spring is prestressed relative to the actuating sleeve 28. Conversely, fastened between an end face 45 of the actuating sleeve 28 remote from the receiving device 1 on the one hand and the cover element 23 on the other is a second spring 46, which is prestressed upon an axial displacement of the actuating sleeve 28 relative to the slide sleeve 22. The spring constant of the second spring 46 is dimensioned to be greater than the spring constant of the first spring 44. The actuating sleeve 28 has a conical portion 47 on the end 21 toward the receiving device 1.

FIG. 5 shows the detail V in FIG. 4, in an enlarged view, in which the region around the detent bolt 26 can in particular be seen better. The detent bolt 26 is inserted into a bolt housing 50, which is screwed by a thread 51 to the slide sleeve 22 and receives a third spring 52. A transverse pin 53 strikes the bolt housing 50 and prevents the detent bolt 26 from being able to be pulled out of the bolt housing 50. The detent bolt 26 protrudes through the axial slot 29 of the actuating sleeve 28 and through the axial slot 39 of the support sleeve 38.

If the detent bolt 26 is moved radially inward by pressure on its head end 54, thus prestressing the third spring 52, the bolt 26 comes into engagement with a shoulder 55 of the connection neck 2.

The mode of operation of the connecting device 20 of the invention upon being mounted on the receiving device 1 and unmounted from the receiving device 1 will now be described below.

The mounting of the connecting device 20 on the receiving device 1 is done in such a way that the user grasps the connecting device 20 by the slide sleeve 22 and guides it toward the receiving device 1 in such a way that the connection neck 2 is introduced into the receiving recess 3. The front end of the connection neck 2 initially still rests on the still-closed detent elements 11. As a result, the slide sleeve 22 is displaced far enough that the shoulder 34 of the connection neck 2 strikes the end face 33, and thus the sliding force exerted on the slide sleeve 22 is transmitted to the connection neck 2. At the same time, the support sleeve 38 is in contact with an end face 56 of the receiving device 1. Upon further displacement of the connection neck 2 together with the slide sleeve 22, both the first spring 44 and the second spring 46 are prestressed. However, since the second spring 46 has a substantially higher spring constant than the first spring 44, even after a slight displacement travel of the slide sleeve 22 via the second spring 46 such a great force is transmitted to the actuating sleeve 28 that the actuating sleeve 28, with its conical portion 47, slides along the actuating elements 13 that protrude radially out of the receiving device 1. As a result, the actuating elements 13 are tilted radially inward and actuate the lever-like detent elements 11, so that the end portions 15 of the detent elements 11 protrude radially outward. The detent lug 10 of the connection neck 2 can therefore, upon a further displacement of the slide sleeve 22, be guided past the end portions 15 of the detent elements 11, so that the connection neck 2 reaches its final position, shown in FIG. 1.

If the user now lets go of the slide sleeve 22, then as a result of the spring force of the second spring 46, the slide sleeve 22 returns to its outset position. Since the second spring 46 now exerts no further force on the actuating sleeve 28, the force of the first spring 44, oriented in the opposite direction, predominates and pushes the actuating sleeve 28 away from the receiving device 1, so that the actuating sleeve 28 releases the actuating elements 13 and thus the detent elements 11 of the receiving device 1 in such a way that the detent elements 11 engage the detent lug 10 of the connection neck 2 from behind, as shown in FIG. 1. The connecting device 20 of the invention is therefore securely locked on the receiving device 1.

For unmounting the connecting device 20 from the receiving device 1, the procedure is essentially the same, but in addition the detent bolt 6 is pressed radially inward by the user. That is, the user grasps the slide sleeve 22 over again and guides the slide sleeve 22 toward the receiving device 1 until such time as the end face 33 of the cover element 23 strikes the shoulder 34 of the connection neck 2, which is firmly held in the receiving device 1. In this position, by the action of the second spring 46, the actuating sleeve 28 is slipped along the actuating elements 13 of the receiving device 1, so that the end portions 15 of the detent elements 11 are tilted radially outward, and the detent lug 10 of the connection neck 2 is released.

If the displacement sleeve 22 were axially returned from the receiving device 1 or let go without pressing the detent bolt 26, then friction would cause the connection neck 2 to remain in the receiving device 1, and the actuating sleeve 28 would release the detent elements 11 again without the connection neck 2 being disengaged from the receiving device 1. However, if the detent bolt 26 is pressed radially inward, then upon the axial displacement of the slide sleeve 22 away from the receiving device 1, the connection neck 2 is carried along and is disengaged by the receiving device 1. The actuating sleeve 28, via the actuating elements 13, does not release the detent elements 11 until the detent lug 10 of the connection neck 2 has moved past the end portions 15 of the detent elements 11.

Using the connecting device 20 of the invention is therefore extremely easy from the standpoint of manipulation and at the same time guarantees a secure fuel connection. The user can operate the device with only one hand, while conversely, without the provisions of the invention, the connection neck 2 would have to be introduced into the receiving device 1 and pulled out of it again with one hand, while at the same time with the other hand the actuating elements 13 would have to be actuated. The connecting device 20 of the invention is therefore especially well suited to temporary, brief connections of a fuel hose to a fuel distributor line of an internal combustion engine, when many connection operations have to be performed on many internal combustion engines for their test runs in quick succession.

The invention is not limited to the exemplary embodiment shown. In particular, the actuating sleeve 28, support sleeve 38 and slide sleeve 22 can also be embodied in some other way. In a simplified embodiment, the connection between the connection neck 2 and the slide sleeve 22 via the detent bolt 26 can also be omitted; in that case, the connection neck 2 must be pulled out of the receiving device 1 and simultaneously the slide sleeve 22 must be held in a position in which the actuating sleeve 28 actuates the actuating elements 13 of the receiving device 1.

What is claimed is:

1. A connecting device (20) for connecting a connection hose or connection tube to a receiving device (1), wherein the receiving device (1) has at least one detent element (11) that is actuatable by means of at least one actuating element (13), provided on the outside of the receiving device, having a tubular connection neck (2), which is connectable to the connection hose or connection tube and which has a detent lug (10) or detent groove that can be brought into engagement with the detent element (11) of the receiving device (1), characterized by an actuating sleeve (28) for actuating the actuating element (13) of the receiving device (1), and a support sleeve (38), which is braced on the receiving device (1) and is axially displaceable relative to the actuating sleeve (28), prestressing a first spring (44).

2. The connecting device of claim 1, characterized in that a slide sleeve (22) that can be grasped from outside is provided, which engages the connection neck (2).

3. The connecting device of claim 2, characterized in that the connection neck (2), support sleeve (38), actuating sleeve (28) and slide sleeve (22) are disposed coaxially to one another.

4. The connecting device of claim 3,
characterized in that
the slide sleeve (22) at least partly surrounds the actuating sleeve (28); the actuating sleeve (28) at least partly surrounds the support sleeve (38); and the support sleeve (38) at least partly surrounds the connection neck (2).

5. The connecting device of claim 2,
characterized in that
connected to the slide sleeve (22) is a cover element (23), which is penetrated by the connection neck (2).

6. The connecting device of claim 5,
characterized in that
a shoulder (34) of the connection neck (2) abuts against the cover element (23), so that the axial displaceability of the connection neck (2) relative to the slide sleeve (22) is limited on one side.

7. The connecting device of claim 6,
characterized in that
the actuating sleeve (28) is axially displaceable relative to the slide sleeve (22), prestressing a second spring (46).

8. The connecting device of claim 7,
characterized in that
the second spring (46) is disposed between the cover element (23) and an end face (45), oriented toward the connection hose or connection tube, of the actuating sleeve (28).

9. The connecting device of claim 2,
characterized in that
at least one detent bolt (26) is provided on the slide sleeve (22), the detent bolt being radially displaceable such that it can be brought into engagement with a shoulder (55) provided on the connection neck (2).

10. The connecting device of claim 9,
characterized in that
the detent bolt (26) is displaceable counter to a third spring (52), and in an unpressed basic position, the detent bolt (26) enables the axial motion between the connection neck (2) and the slide sleeve (22), and in a pressed actuation position, it carries the connection neck (2) with it upon a motion of the slide sleeve (22) leading away from the receiving device (1).

11. The connecting device of claim 1,
characterized in that
the support sleeve (38) is pressed by the first spring (44) against a stop on the actuating sleeve (28).

12. The connecting device of claim 11,
characterized in that
the stop is formed by a ring (30) inserted into the actuating sleeve (28).

\* \* \* \* \*